United States Patent
Tang (10) Patent No.: US 10,785,730 B2
(45) Date of Patent: Sep. 22, 2020

(54) SCHEDULING METHOD, POWER CONTROL METHOD, AND BASE STATION

(71) Applicant: HUAWEI TECHNOLOGIES CO., LTD., Shenzhen (CN)

(72) Inventor: Zhihua Tang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 8 days.

(21) Appl. No.: 16/257,097

(22) Filed: Jan. 25, 2019

(65) Prior Publication Data

US 2019/0174425 A1    Jun. 6, 2019

Related U.S. Application Data

(63) Continuation of application No. PCT/CN2016/091604, filed on Jul. 25, 2016.

(51) Int. Cl.
| | |
|---|---|
| *H04W 52/24* | (2009.01) |
| *H04W 72/14* | (2009.01) |
| *H04W 52/36* | (2009.01) |
| *H04W 52/60* | (2009.01) |
| *H04W 72/04* | (2009.01) |
| *H04W 88/08* | (2009.01) |
| *H04W 52/14* | (2009.01) |
| *H04W 52/08* | (2009.01) |

(52) U.S. Cl.
CPC ....... *H04W 52/243* (2013.01); *H04W 52/241* (2013.01); *H04W 52/242* (2013.01); *H04W 52/367* (2013.01); *H04W 52/60* (2013.01); *H04W 72/0473* (2013.01); *H04W 72/0493* (2013.01); *H04W 72/14* (2013.01); *H04W 88/08* (2013.01); *H04W 52/08* (2013.01); *H04W 52/146* (2013.01)

(58) Field of Classification Search
None
See application file for complete search history.

(56) References Cited

U.S. PATENT DOCUMENTS

| | | | | |
|---|---|---|---|---|
| 8,462,646 | B2* | 6/2013 | Barberis | H04B 17/345 |
| | | | | 370/252 |
| 9,629,136 | B1* | 4/2017 | Sitaram | H04L 5/0073 |

(Continued)

FOREIGN PATENT DOCUMENTS

| | | |
|---|---|---|
| CN | 101472339 A | 7/2009 |
| CN | 101572868 A | 11/2009 |

(Continued)

*Primary Examiner* — Ayaz R Sheikh
*Assistant Examiner* — Tarell A Hampton
(74) *Attorney, Agent, or Firm* — Kilpatrick Townsend & Stockton LLP (57) ABSTRACT

A power control method and a base station are provided. The base station obtains a first resource block (RB) set and a second RB set after a power control cycle arrives, wherein the first RB set is an RB set that is allocated by the first base station to first user equipment (UE) in a first cell at each transmission time interval (TTI) in the power control cycle, and the second RB set is an RB set that is allocated by a second base station to second UE in a second cell at each TTI in the power control cycle. Then the base station performs power control on the first UE based on the first RB set and the second RB set.

8 Claims, 7 Drawing Sheets

(56) References Cited

U.S. PATENT DOCUMENTS

| | | | | |
|---|---|---|---|---|
| 2008/0068981 | A1* | 3/2008 | Marinier | H04W 52/343 370/208 |
| 2008/0253319 | A1* | 10/2008 | Ji | H04W 16/12 370/328 |
| 2009/0179755 | A1* | 7/2009 | Bachl | H04W 72/082 340/540 |
| 2010/0035653 | A1* | 2/2010 | Chang | H04W 52/346 455/561 |
| 2010/0177722 | A1* | 7/2010 | Guvenc | H04W 52/244 370/329 |
| 2010/0234061 | A1* | 9/2010 | Khandekar | H04W 52/146 455/522 |
| 2010/0267408 | A1* | 10/2010 | Lee | H04W 52/243 455/509 |
| 2010/0273498 | A1* | 10/2010 | Kim | H04W 24/02 455/450 |
| 2010/0309864 | A1* | 12/2010 | Tamaki | H04W 52/42 370/329 |
| 2010/0322202 | A1* | 12/2010 | Ohta | H04L 1/0026 370/336 |
| 2011/0176453 | A1* | 7/2011 | Monogioudis | H04W 16/22 370/254 |
| 2011/0223929 | A1* | 9/2011 | Boudreau | H04W 72/1231 455/452.1 |
| 2011/0228680 | A1* | 9/2011 | Ball | H04W 52/346 370/241 |
| 2011/0275381 | A1* | 11/2011 | Moberg | H04W 72/0406 455/450 |
| 2012/0225688 | A1* | 9/2012 | Yamazaki | H04L 5/0035 455/522 |
| 2012/0282889 | A1* | 11/2012 | Tanaka | H04J 11/0053 455/405 |
| 2012/0320770 | A1* | 12/2012 | Jen | H04W 72/085 370/252 |
| 2012/0329497 | A1* | 12/2012 | Yamazaki | H04W 28/04 455/501 |
| 2013/0003680 | A1* | 1/2013 | Yamamoto | G01S 5/0205 370/329 |
| 2013/0005379 | A1* | 1/2013 | Yamazaki | H04W 52/143 455/509 |
| 2013/0034079 | A1* | 2/2013 | Takano | H04W 52/0229 370/330 |
| 2013/0188576 | A1 | 7/2013 | Chao et al. | |
| 2013/0223401 | A1* | 8/2013 | Kitahara | H04W 72/082 370/329 |
| 2013/0225159 | A1* | 8/2013 | Hulkkonen | H04W 16/14 455/423 |
| 2013/0294390 | A1* | 11/2013 | Yang | H04W 76/27 370/329 |
| 2015/0181464 | A1 | 6/2015 | Lee et al. | |
| 2015/0327289 | A1* | 11/2015 | Hessler | H04W 72/1268 370/336 |
| 2016/0128092 | A1* | 5/2016 | Azarian Yazdi | H04L 1/0002 370/329 |
| 2016/0323893 | A1 | 11/2016 | Feng et al. | |

FOREIGN PATENT DOCUMENTS

| | | | | |
|---|---|---|---|---|
| CN | 101841915 | A | | 9/2010 |
| CN | 102143595 | A | | 8/2011 |
| CN | 104247534 | A | | 12/2014 |
| CN | 104754587 | A | | 7/2015 |
| CN | 104935396 | A | | 9/2015 |
| EP | 2512175 | A1 | | 10/2012 |
| EP | 2606686 | B1 | | 6/2013 |
| JP | 2006333346 | A | | 12/2006 |
| JP | 2011101344 | A | * | 5/2011 |
| JP | 2012147041 | A | | 8/2012 |
| WO | WO-2009007722 | A1 | * | 1/2009 ......... H04W 52/243 |
| WO | WO-2012062226 | A2 | * | 5/2012 ......... H04L 5/0053 |
| WO | 2015161440 | A1 | | 10/2015 |
| WO | 2016082085 | A1 | | 6/2016 |
| WO | 2016089270 | A1 | | 6/2016 |

* cited by examiner

| 1 | 1 | 3 | 1 | −1 | −1 | −1 | 0 | −1 | −1 |
|---|---|---|---|---|---|---|---|---|---|
| TTI 0 | TTI 1 | TTI 2 | TTI 3 | TTI 4 | TTI 5 | TTI 6 | TTI 7 | TTI 8 | TTI 9 |

SCHEDULING METHOD, POWER CONTROL METHOD, AND BASE STATION

CROSS-REFERENCE TO RELATED APPLICATIONS

This application is a continuation of International Application No. PCT/CN2016/091604, filed on Jul. 25, 2016, the disclosure of which is hereby incorporated by reference in its entirety.

TECHNICAL FIELD

The present application relates to the field of communications technologies, and in particular, to a scheduling method, a power control method, and a base station.

BACKGROUND

In a mobile communications system, intra-cell interference and inter-cell interference (ICI) are two main factors that restrict system performance. An orthogonal frequency division multiplexing (OFDM) technology used in a Long Term Evolution (LTE) system can provide orthogonal subcarriers, so that a problem of intra-cell interference can be well resolved. As a result, inter-cell interference becomes the major factor that restricts performance of the LTE system.

Figure 1:
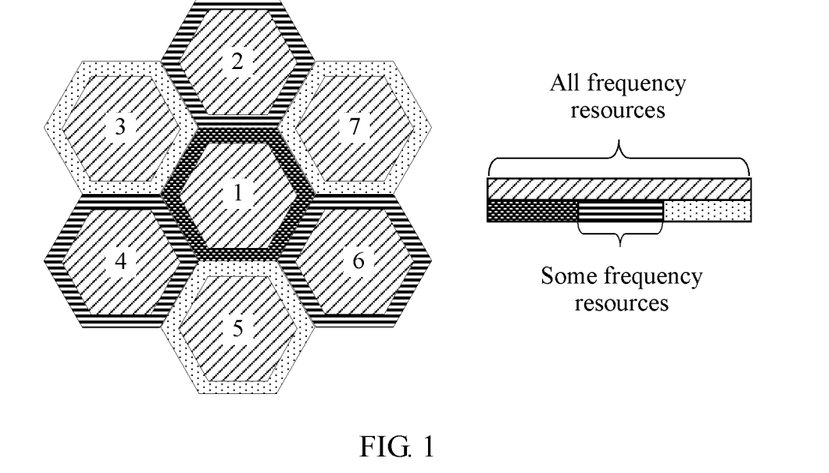
FIG. 1 is a schematic diagram of a frequency resource allocation solution in the prior art.

Currently, an inter-cell interference coordination (ICIC) technology is used to suppress inter-cell interference. A principle of the technology is to allow a cell center user (CCU) to freely use all frequency resources, and allow a cell edge user (CEU) to use only some frequency resources according to a frequency multiplexing rule. For example, as shown in FIG. 1, frequency resources of a system may be divided into three bands. While CCUs in all cells are allowed to use all the frequency resources, a CEU in a cell 1 is allowed to use only a first frequency band, CEUs in a cell 2, a cell 4, and a cell 6 are allowed to use only a second frequency band, and CEUs in a cell 3, a cell 5, and a cell 7 are allowed to use only a third frequency band. In this way, frequency resources used by CEUs in neighboring cells may not overlap, and interference between CEUs in neighboring cells can be effectively suppressed.

However, based on the existing ICIC technology, a CEU in a current cell and a CCU in a neighboring cell may be scheduled on a same frequency band. Compared with a CEU in the neighboring cell, the CCU in the neighboring cell probably causes severer interference to the CEU in the current cell. Therefore, the existing method for suppressing inter-cell interference may not achieve the objective of suppressing inter-cell interference, but may deteriorate performance of a system edge user.

SUMMARY

In view of this, embodiments of the present invention provide a scheduling method, a power control method, and a base station, to at least resolve a prior-art problem that inter-cell interference may not be suppressed but performance of a system edge user may be deteriorated, thereby effectively suppressing inter-cell interference, and improving performance of the system edge user and average performance of a system.

To achieve the foregoing objective, the following technical solutions are used in the embodiments of the present invention.

According to a first aspect, a scheduling method is provided, including: obtaining, by a first base station, a first resource block RB set and a second RB set, where the first RB set is an RB set that is allocated by the first base station to first user equipment UE in a first cell, and the second RB set is an RB set that is allocated by a second base station to second UE in a second cell; then after determining that the first RB set and the second RB set have a common RB, adjusting, by the first base station, the first RB set to reduce interference from the first cell to the second cell; and finally scheduling, by the first base station, the first UE based on an adjusted first RB set.

In a first possible implementation of the first aspect, the adjusting, by the first base station, the first RB set to reduce interference from the first cell to the second cell includes: determining, by the first base station, whether a first RB meets a preset condition, deleting the first RB from the first RB set if the first RB meets the preset condition, and using an RB following the first RB as a new first RB to perform determining until a first RB that does not meet the preset condition is found for the first time; and determining, by the first base station, whether a second RB meets the preset condition, deleting the second RB from the first RB set if the second RB meets the preset condition, and using an RB before the second RB as a new second RB to perform determining until a second RB that does not meet the preset condition is found for the first time, where the first RB is a beginning RB in the first RB set, the second RB is a last RB in the first RB set, the preset condition is that first system utility is greater than second system utility, the first system utility is system utility used when scheduling of the first UE on the first/second RB is canceled, and the second system utility is system utility used when scheduling of the first UE on the first/second RB is reserved.

In a second possible implementation of the first aspect, the first base station calculates system utility by using a preset calculation formula, and the preset calculation formula is:

$$U_{RB_i} = \sum_j lg(x_j),$$

where $x_j = \log_2(1+SINR_{UEj})$, $U_{RB_i}$ represents the system utility, represents a transmission rate of $j^{th}$ second UE in n UEs that share a resource block $RB_i$ in a system, $SINR_{UEj}$ represents a signal to interference plus noise ratio of an uplink transmission channel from the $j^{th}$ second UE to the first base station, and n and j are positive integers.

In a third possible implementation of the first aspect, if the first base station deletes the first/second RB from the first RB set, the method further includes: after determining that third system utility is greater than the first system utility, allocating, by the first base station, the first/second RB to third UE that has a scheduling requirement but has not been scheduled at a current transmission time interval TTI, where the third system utility is system utility used when scheduling of the third UE on the first/second RB is added.

In this way, in a process in which the first base station performs resource adjustment on the first UE, if scheduling of the first UE on some RBs is canceled, the RBs are allocated to UE that has a scheduling requirement but has not been scheduled, in other words, once a surplus resource occurs, a new user is scheduled on the surplus resource, so as to improve usage of system resources, thereby improving system performance.

According to a second aspect, a base station is provided, including: an obtaining unit, an adjustment unit, and a scheduling unit; and the obtaining unit is configured to obtain a first resource block RB set and a second RB set, where the first RB set is an RB set that is allocated by the base station to first user equipment UE in a first cell, and the second RB set is an RB set that is allocated by a second base station to second UE in a second cell; the adjustment unit is configured to: after determining that the first RB set and the second RB set have a common RB, adjust the first RB set to reduce interference from the first cell to the second cell; and the scheduling unit is configured to schedule the first UE based on an adjusted first RB set.

In a first possible implementation of the second aspect, the adjustment unit is specifically configured to: determine whether a first RB meets a preset condition, delete the first RB from the first RB set if the first RB meets the preset condition, and use an RB following the first RB as a new first RB to perform determining until a first RB that does not meet the preset condition is found for the first time; and determine whether a second RB meets the preset condition, delete the second RB from the first RB set if the second RB meets the preset condition, and use an RB before the second RB as a new second RB to perform determining until a second RB that does not meet the preset condition is found for the first time; where the first RB is a beginning RB in the first RB set, the second RB is a last RB in the first RB set, the preset condition is that first system utility is greater than second system utility, the first system utility is system utility used when scheduling of the first UE on the first/second RB is canceled, and the second system utility is system utility used when scheduling of the first UE on the first/second RB is reserved.

In a second possible implementation of the second aspect, the adjustment unit is specifically configured to: calculate system utility by using a preset calculation formula, and the preset calculation formula is:

$$U_{RB_i} = \sum_j lg(x_j),$$

where $x_j = \log_2(1 + SINR_{UEj})$, $U_{RB_i}$ represents the system utility, $x_j$ represents a transmission rate of $j^{th}$ second UE in n UEs that share a resource block $RB_i$ in a system, $SINR_{UEj}$ represents a signal to interference plus noise ratio of an uplink transmission channel from the $j^{th}$ second UE to the base station, and n and j are positive integers.

In a third possible implementation of the second aspect, the adjustment unit is further configured to: if the first/second RB is deleted from the first RB set, after determining that third system utility is greater than the first system utility, allocate the first/second RB to third UE that has a scheduling requirement but has not been scheduled at a current transmission time interval TTI, where the third system utility is system utility used when scheduling of the third UE on the first/second RB is added.

In this way, in a process in which the base station performs resource adjustment on the first UE, if scheduling of the first UE on some RBs is canceled, the RBs are allocated to UE that has a scheduling requirement but has not been scheduled, in other words, once a surplus resource occurs, a new user is scheduled on the surplus resource, so as to improve usage of system resources, thereby improving system performance.

According to a third aspect, a base station is provided, including: a processor, a memory, a bus, and a communications interface; and the memory is configured to store a computer-executable instruction, the processor and the memory are connected by using the bus, and when the base station runs, the processor executes the computer-executable instruction stored in the memory, so that the base station performs the scheduling method according to any one of the first aspect or the first to the third possible implementations of the first aspect.

Based on the scheduling method and the base station that are provided in the embodiments of the present invention, the base station obtains the first RB set that is allocated by the base station to the first UE in the first cell and the second RB set that is allocated by the second base station to the second UE in the second cell, and after determining that the first RB set and the second RB set have a common RB, adjusts the first RB set. The base station may specifically learn, based on the first RB set and the second RB set, which shared resources cause inter-cell interference between the first UE in the first cell and the second UE in the second cell, and accordingly adjusts the first RB set, so as to schedule the first UE in the first cell and the second UE in the second cell to different frequency bands as much as possible, thereby effectively suppressing inter-cell interference, and improving performance of a system edge user and average performance of a system.

According to a fourth aspect, a power control method is provided, including: obtaining, by a first base station, a first resource block RB set and a second RB set after a power control cycle arrives, where the first RB set is an RB set that is allocated by the first base station to first user equipment UE in a first cell at each transmission time interval TTI in the power control cycle, and the second RB set is an RB set that is allocated by a second base station to second UE in a second cell at each TTI in the power control cycle; and performing, by the first base station, power control on the first UE based on the first RB set and the second RB set.

In a first possible implementation of the fourth aspect, the performing, by the first base station, power control on the first UE based on the first RB set and the second RB set includes: determining, by the first base station based on the first RB set and the second RB set, first system utility corresponding to each TTI in the power control cycle, where the first system utility comprises four pieces of system utility obtained if a transmit power control TPC command of the first UE at each TTI in the power control cycle is −1, 0, 1, and 3; determining, by the first base station, an optimal TPC command of the first UE at each TTI in the power control cycle based on the first system utility corresponding to each TTI in the power control cycle, where the optimal TPC command of the first UE at each TTI in the power control cycle is a TPC command corresponding to maximum system utility in the first system utility corresponding to the TTI; determining, by the first base station, an optimal TPC command of the first UE in the power control cycle based on the optimal TPC command of the first UE at each TTI in the power control cycle; and sending, by the first base station, the optimal TPC command to the first UE, so that the first UE adjusts transmit power based on the optimal TPC command.

In a second possible implementation of the fourth aspect, the determining, by the first base station, an optimal TPC command of the first UE in the power control cycle based on the optimal TPC command of the first UE at each TTI in the power control cycle includes: collecting, by the first base station, statistics about the optimal TPC commands of the first UE at the TTIs in the power control cycle to determine a most frequent TPC command, and determining the most frequent TPC command as the optimal TPC command of the first UE in the power control cycle.

In a third possible implementation of the fourth aspect, the determining, by the first base station, an optimal TPC command of the first UE in the power control cycle based on the optimal TPC command of the first UE at each TTI in the power control cycle includes: adding, by the first base station, the optimal TPC commands of the first UE at the TTIs in the power control cycle, to obtain a sum value, and determining an optimal TPC command of the first UE that is in the optimal TPC commands at the TTIs in the power control cycle and that is closest to the sum value as the optimal TPC command of the first UE in the power control cycle.

In a fourth possible implementation of the fourth aspect, the first base station calculates system utility by using a preset calculation formula, and the preset calculation formula is:

$$U = \sum_j lg(x_j),$$

where $$x_j = B \times \log_2\left(1 + \frac{S}{I+N}\right),$$

represents the system utility, $x_j$ represents a transmission rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

According to a fifth aspect, a base station is provided, including: an obtaining unit and a control unit; and the obtaining unit is configured to obtain a first resource block RB set and a second RB set after a power control cycle arrives, where the first RB set is an RB set that is allocated by the base station to first user equipment UE in a first cell at each transmission time interval TTI in the power control cycle, and the second RB set is an RB set that is allocated by a second base station to second UE in a second cell at each TTI in the power control cycle; and the control unit is configured to perform power control on the first UE based on the first RB set and the second RB set.

In a first possible implementation of the fifth aspect, the control unit is specifically configured to: determine, based on the first RB set and the second RB set, first system utility corresponding to each TTI in the power control cycle, where the first system utility comprises four pieces of system utility obtained if a transmit power control TPC command of the first UE at each TTI in the power control cycle is −1, 0, 1, and 3; determine an optimal TPC command of the first UE at each TTI in the power control cycle based on the first system utility corresponding to each TTI in the power control cycle, where the optimal TPC command of the first UE at each TTI in the power control cycle is a TPC command corresponding to maximum system utility in the first system utility corresponding to the TTI; determine an optimal TPC command of the first UE in the power control cycle based on the optimal TPC command of the first UE at each TTI in the power control cycle; and send the optimal TPC command to the first UE, so that the first UE adjusts transmit power based on the optimal TPC command.

In a second possible implementation of the fifth aspect, the control unit is specifically configured to: collect statistics about the optimal TPC commands of the first UE at the TTIs in the power control cycle to determine a most frequent TPC command, and determine the most frequent TPC command as the optimal TPC command of the first UE in the power control cycle.

In a third possible implementation of the fifth aspect, the control unit is specifically configured to: add the optimal TPC commands of the first UE at the TTIs in the power control cycle, to obtain a sum value, and determine an optimal TPC command of the first UE that is in the optimal TPC commands at the TTIs in the power control cycle and that is closest to the sum value as the optimal TPC command of the first UE in the power control cycle.

In a fourth possible implementation of the fifth aspect, the control unit is specifically configured to: calculate system utility by using a preset calculation formula, and the preset calculation formula is:

$$U = \sum_j lg(x_j),$$

where $$x_j = B \times \log_2\left(1 + \frac{S}{I+N}\right),$$

U represents the system utility, $x_j$ represents a transmission rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

According to a sixth aspect, a base station is provided, including: a processor, a memory, a bus, and a communications interface; and the memory is configured to store a computer-executable instruction, the processor and the memory are connected by using the bus, and when the base station runs, the processor executes the computer-executable instruction stored in the memory, so that the base station performs the power control method according to any one of the fourth aspect or the first to the fourth possible implementations of the fourth aspect.

Based on the power control method and the base station that are provided in the embodiments of the present invention, after the power control cycle arrives, the base station obtains the first RB set that is allocated by the base station to the first UE in the first cell at each TTI in the power control cycle and the second RB set that is allocated by the second base station to the second UE in the second cell at each TTI in the power control cycle, and further performs power control on the first UE based on the first RB set and the second RB set, to be specific, adjusts transmit power of the UE, so as to reduce interference of the UE to a neighboring cell. Therefore, according to the power control method provided in the embodiments of the present invention, inter-cell interference can be reduced to some extent, thereby improving performance of a system edge user and average performance of a system.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely a part rather than all of the embodiments of the present invention. In the following descriptions, for a purpose of description instead of limitation, some specific details are described to facilitate clear understanding. In some embodiments, detailed descriptions of a well-known apparatus, circuit, and method are omitted, so as to avoid blurred descriptions caused by unnecessary details. In the thorough descriptions, same reference numerals and same names refer to same or similar elements.

First, related devices in the embodiments of the present invention are briefly described below.

User equipment (UE) is a terminal device, and may be a movable terminal device or an unmovable terminal device. The device is mainly configured to receive or send service data. The user equipment may be distributed in a network. The user equipment in different networks has different names, such as a terminal, a mobile station, a subscriber unit, a station, a cellular phone, a personal digital assistant, a wireless modem, a wireless communications device, a handheld device, a laptop computer, a cordless telephone set, and a wireless local loop station. The user equipment may communicate with one or more core networks by using a radio access network (RAN) (an access part of a wireless communications network), for example, exchange voice and/or data with the radio access network.

A base station (BS) is an apparatus that is deployed in a radio access network and configured to provide a wireless communication function. For example, a device that provides a base station function in a 2G network includes a base transceiver station (BTS) and a base station controller (BSC), a device that provides a base station function in a 3G network includes a NodeB (NodeB) and a radio network controller (RNC), and a device that provides a base station function in a 4G network includes an evolved NodeB (eNB).

Figure 2:
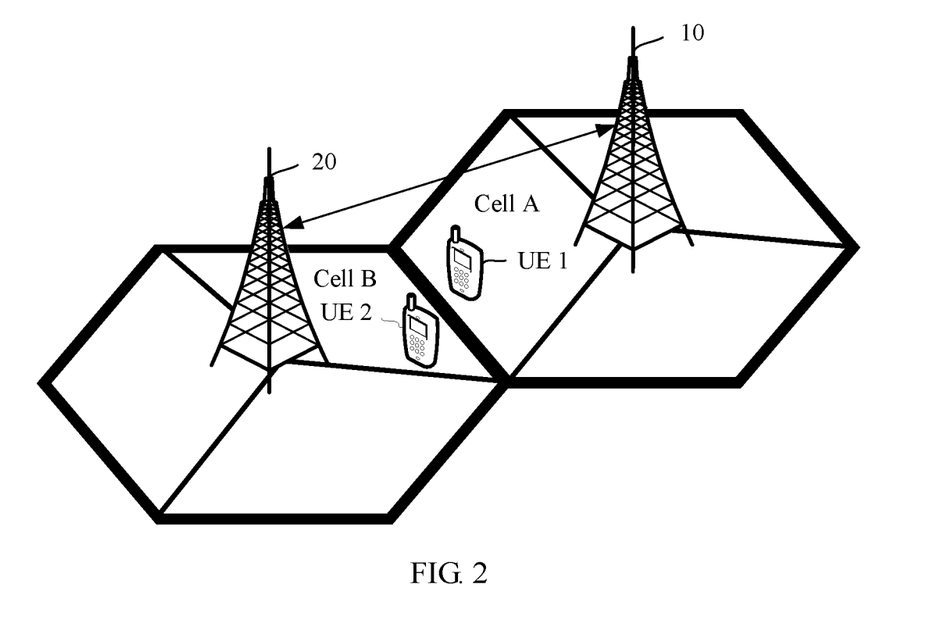
FIG. 2 is a first schematic diagram of an application scenario according to an embodiment of the present invention.
Figure 3:
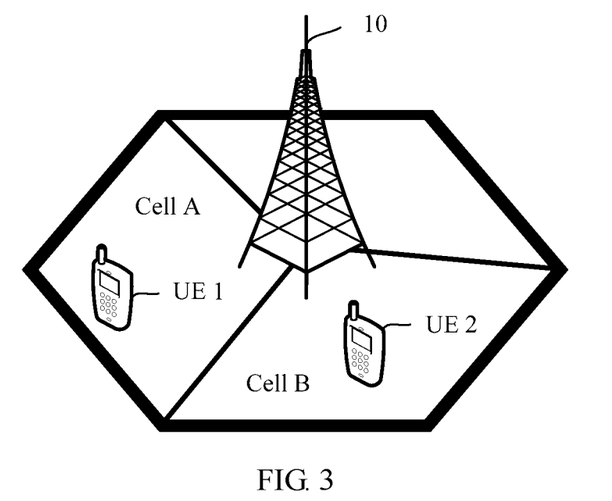
FIG. 3 is a second schematic diagram of an application scenario according to an embodiment of the present invention.
Figure 4:
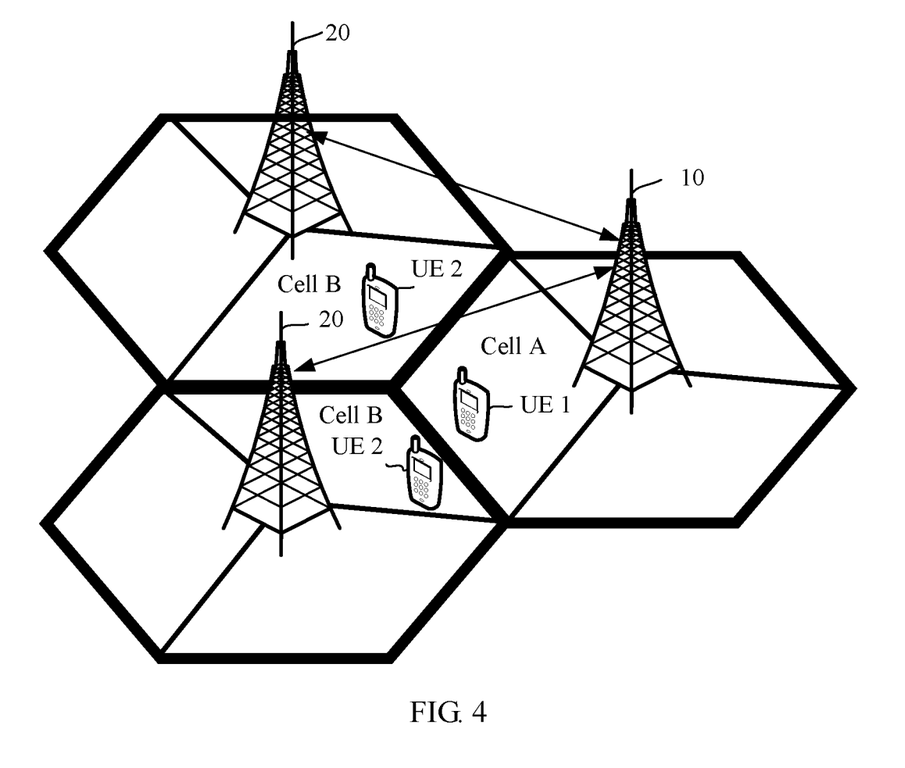
FIG. 4 is a third schematic diagram of an application scenario according to an embodiment of the present invention.

Second, possible application scenario diagrams of the embodiments of the present invention are separately shown in FIG. 2 to FIG. 4. In the diagrams, a base station 10 represents a first base station, a base station 20 represents a second base station, a cell A represents a first cell, a cell B represents a second cell, UE 1 represents first UE, and UE 2 represents second UE. In an application scenario diagram shown in FIG. 2, the first UE is located in the first cell, and the second UE is located in the second cell; the first base station to which the first cell belongs and the second base station to which the second cell belongs are two different base stations; and there is one second base station. In an application scenario shown in FIG. 3, the first UE is located in the first cell, and the second UE is located in the second cell; and the first base station to which the first cell belongs and the second base station to which the second cell belongs are a same base station. In an application scenario shown in FIG. 4, the first UE is located in the first cell, and the second UE is located in the second cell; the first base station to which the first cell belongs and the second base station to which the second cell belongs are two different base stations; and there is more than one second base station.

In the application scenario diagrams shown in FIG. 2 to FIG. 4, the first base station 10 obtains scheduling information of the first UE and scheduling information of the second UE, and adjusts the scheduling information of the first UE based on the obtained scheduling information, to avoid a conflict over time-frequency resources used by users in neighboring cells as much as possible. Alternatively, the first base station 10 controls transmit power of the first UE based on the obtained scheduling information, to minimize interference between users in neighboring cells. In this way, an objective of suppressing inter-cell interference and improving performance of a system edge user and average performance of a system is achieved. For a specific scheduling process, refer to a scheduling method described in FIG. 6 in the embodiments of the present invention. For a power control process, refer to a power control method described in FIG. 9 in the embodiments of the present invention.

Figure 5:
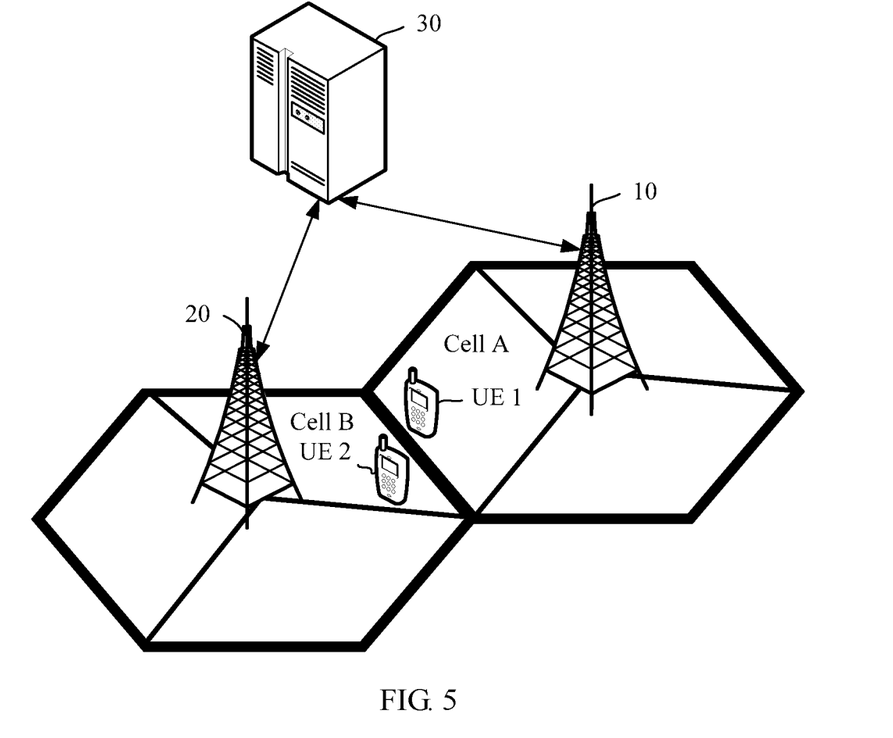
FIG. 5 is a fourth schematic diagram of an application scenario according to an embodiment of the present invention.

In addition to the three possible application scenarios shown in FIG. 2 to FIG. 4, the embodiments of the present invention further provide a fourth possible application scenario diagram, as shown in FIG. 5. When FIG. 5 is compared with FIG. 2, a noticeable difference between FIG. 5 and FIG. 2 lies in that a centralized controller 30 is added to the application scenario diagram shown in FIG. 5. The centralized controller 30 may be configured as a separate network element, or may be configured in a network element on a core network side. For example, in an LTE system, the centralized controller 30 may be specifically configured in a mobility management entity (MME) or a serving gateway (SGW). This is not specifically limited in the embodiments of the present invention. In an application scenario shown in FIG. 5, the centralized controller 30 replaces the first base station 10 to perform scheduling or power control on the first UE. For details, refer to methods described in FIG. 8 and FIG. 11 of the embodiments of the present invention.

Figure 6:
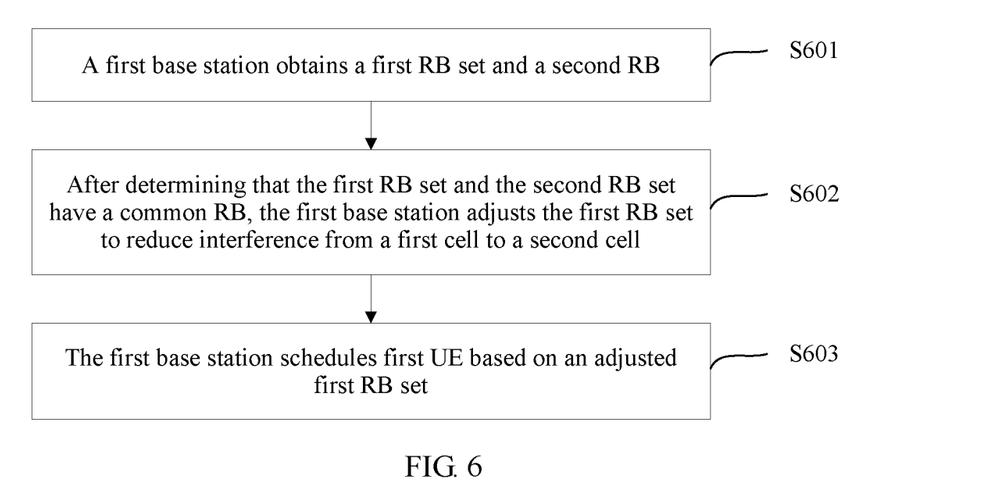
FIG. 6 is a first schematic flowchart of a scheduling method according to an embodiment of the present invention.

Based on the application scenarios shown in FIG. 2 to FIG. 4, an embodiment of the present invention provides a scheduling method. As shown in FIG. 6, the method includes the following steps.

S601. A first base station obtains a first resource block (RB) set and a second RB set.

The first RB set is an RB set that is allocated by the first base station to first UE in a first cell, and the second RB set is an RB set that is allocated by a second base station to second UE in a second cell.

Specifically, after completing basic scheduling of the first UE, the first base station triggers the scheduling method provided in this embodiment of the present invention. The basic scheduling refers to a process in which a base station determines, based on an uplink scheduling request sent by UE, a buffer status report of the UE, and an uplink channel state, whether to allocate a radio resource to the UE that initiates the scheduling request and a quantity of radio resources to be allocated.

It should be noted that when the first base station and the second base station are two different base stations, to be specific, in the application scenarios shown in FIG. 2 and FIG. 4, the first base station may communicate with the second base station through an X2 interface, so as to obtain the second RB set. When the first base station and the second base station are a same base station, to be specific, in the application scenario shown in FIG. 3, the first base station may directly obtain the second RB set.

S602. After determining that the first RB set and the second RB set have a common RB, the first base station adjusts the first RB set to reduce interference from a first cell to a second cell.

A process in which the first base station adjusts the first RB set to reduce interference from the first cell to the second cell may specifically include:

determining, by the first base station, whether a first RB meets a preset condition, deleting the first RB from the first RB set if the first RB meets the preset condition, and using an RB following the first RB as a new first RB to perform determining until a first RB that does not meet the preset condition is found for the first time; and determining, by the first base station, whether a second RB meets the preset condition, deleting the second RB from the first RB set if the second RB meets the preset condition, and using an RB before the second RB as a new second RB to perform determining until a second RB that does not meet the preset condition is found for the first time.

The first RB is a beginning RB in the first RB set, the second RB is a last RB in the first RB set, the preset condition is that first system utility is greater than second system utility, the first system utility is system utility used when scheduling of the first UE on the first/second RB is canceled, and the second system utility is system utility used when scheduling of the first UE on the first/second RB is reserved. It is easy to understand that when scheduling of the first UE on an RB is canceled, intensity of interference to the second UE in a neighboring cell decreases, utility of the second UE on the RB increases. Because scheduling of the first UE on the RB is canceled, utility of the first UE on the RB is 0. Therefore, when scheduling of the first UE on an RB is canceled, system utility may increase or may decrease. In other words, the first system utility may be greater than the second system utility, or may be less than the second system utility.

The system utility may be specifically calculated by using a calculation formula shown in formula (1):

$$U_{RB_i} = \sum_j lg(x_j) \qquad \text{formula (1)}$$

In the formula, $x_j=\log_2(1+SINR_{UEj})$, $U_{RB_i}$ represents the system utility, $x_j$ represents a transmission rate of $j^{th}$ second UE in n UEs that share a resource block $RB_i$ in a system, $SINR_{UEj}$ represents a signal to interference plus noise ratio of an uplink transmission channel from the $j^{th}$ second UE to the first base station, and n and j are positive integers.

Further, for the signal to interference plus noise ratio $SINR_{UEj}$, there may be specifically the following two optional calculation manners.

In one optional implementation, measurement information of the second cell is converted to intensity of interference to the second UE when scheduling of the first UE is canceled, and formula (2) is used to calculate $SINR_{UEj}$ when scheduling of the first UE is canceled:

$$SINR_{UEj} = \frac{S}{I+N} \qquad \text{formula (2)}$$

In the formula, S represents transmit power of a wanted signal, I represents interference intensity, and N represents noise strength.

In another optional implementation, reference signal received power (RSRP) measured by the second base station is converted to a corresponding modification coefficient, and the modification coefficient is used to modify $SINR_{UEj}$ measured by the first base station to obtain $SINR_{UEj}$ used when scheduling of the first UE is canceled.

Certainly, the foregoing descriptions are merely two common methods for calculating an SINR listed in this embodiment of the present invention. A person skilled in the art may understand that there are other methods for calculating an SINR. This is not specifically limited in this embodiment of the present invention.

For example, the following describes in detail the process of adjusting the first RB set by the first base station with reference to a specific example.

Figure 7:
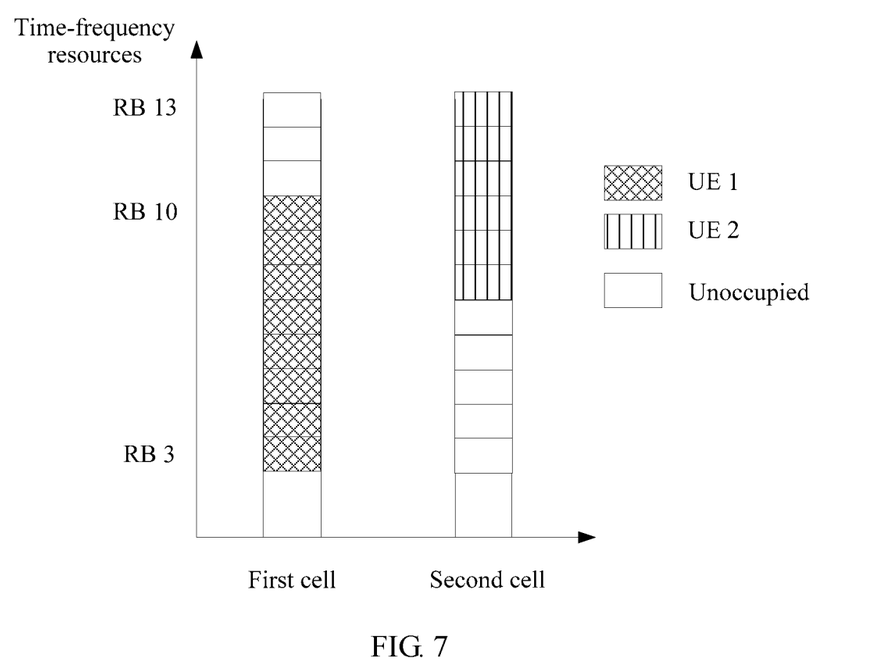
FIG. 7 is a schematic diagram of resource allocation after basic scheduling.

Referring to a basic scheduling result shown in FIG. 7, if the first RB set that is allocated by the first base station to the first UE (UE 1) in the first cell includes an RB 3 to an RB 10, and the second RB set that is allocated by the second base station to the second UE (UE 2) in the second cell includes an RB 8 to an RB 13, the process of adjusting the first RB set by the first base station is as follows: The first base station determines whether the RB 3 meets the preset condition, to be specific, whether the system utility is increased if scheduling of the UE 1 on the RB 3 is canceled. If the RB 3 meets the preset condition, the first base station deletes the RB 3 from the first RB set, and continues to determine whether the RB 4 meets the preset condition. If the RB 4 meets the preset condition, the first base station also deletes the RB 4 from the first RB set, and continues to determine a next RB until an RB that does not meet the preset condition is found for the first time. In addition, the first base station determines whether the RB 13 meets the preset condition, to be specific, whether the system utility is increased if scheduling of the UE 1 on the RB 13 is canceled. If the RB 13 meets the preset condition, the first base station deletes the RB 13 from the first RB set, and continues to determine whether the RB 12 meets the preset condition. If the RB 12 meets the preset condition, the first base station also deletes the RB 12 from the first RB set, or if the RB 12 does not meet the preset condition, the first base station continues to determine a next RB until an RB that does not meet the preset condition is found for the first time.

S603. The first base station schedules first UE based on an adjusted first RB set.

Based on the foregoing solution, the first base station obtains the first RB set that is allocated by the first base station to the first UE in the first cell and the second RB set that is allocated by the second base station to the second UE in the second cell, and after determining that the first RB set and the second RB set have a common RB, adjusts the first RB set. The first base station may specifically learn, based on the first RB set and the second RB set, which shared resources cause inter-cell interference between the first UE in the first cell and the second UE in the second cell, and accordingly adjusts the first RB set, so as to schedule the first UE in the first cell and the second UE in the second cell to different frequency bands as much as possible, thereby effectively suppressing inter-cell interference, and improving performance of a system edge user and average performance of a system.

Preferably, in the scheduling method provided in this embodiment of the present invention, if the first base station deletes the first/second RB from the first RB set, the method may further include:

after determining that third system utility is greater than the first system utility, allocating, by the first base station, the first/second RB to third UE that has a scheduling requirement but has not been scheduled at a current transmission time interval (TTI).

The third system utility is system utility used when scheduling of the third UE on the first/second RB is added.

In a process in which the first base station performs resource adjustment on the first UE, if scheduling of the first UE on some RBs is canceled, the RBs may be allocated to UE that has a scheduling requirement but has not been scheduled. In other words, once a surplus resource occurs, a new user is scheduled on the surplus resource, so as to make full use of resources and improve system performance.

Figure 8:
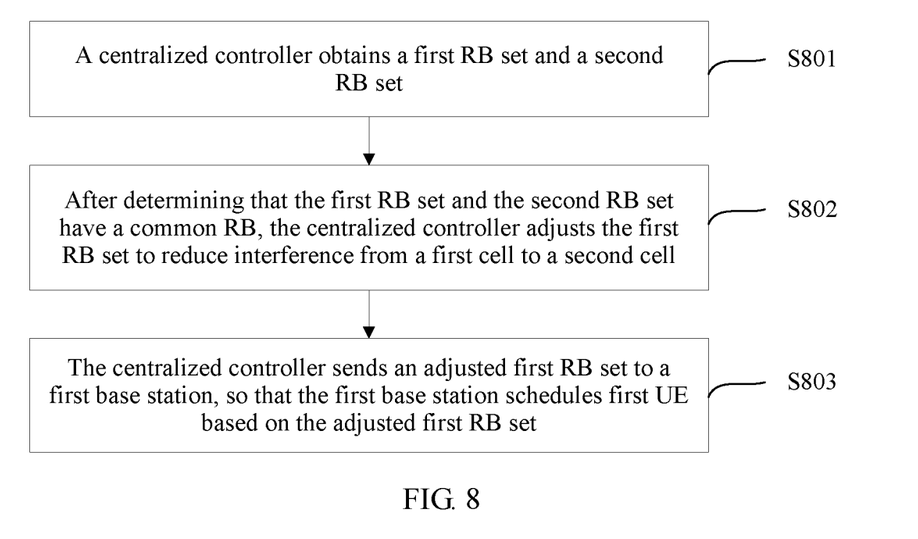
FIG. 8 is a second schematic flowchart of a scheduling method according to an embodiment of the present invention.

Based on the application scenario shown in FIG. 5, an embodiment of the present invention further provides a scheduling method. As shown in FIG. 8, the method includes the following steps.

S801. A centralized controller obtains a first RB set and a second RB set.

The first RB set is an RB set that is allocated by a first base station to first user equipment UE in a first cell, and the second RB set is an RB set that is allocated by a second base station to second UE in a second cell.

The centralized controller may be configured as a separate network element, or may be configured, on a network device on a core network side, for example, on an MME or an SGW. When the centralized controller is configured as a separate network element, a dedicated interface is configured for the centralized controller and a base station, so that the centralized controller obtains an RB set that is allocated by the base station to UE. When the centralized controller is configured on a network device on a core network side, an RB set that is allocated by a base station to UE is obtained through a corresponding communications interface between the network device and the base station. For example, when the centralized controller is configured on an MME, an RB set that is allocated by a base station to UE may be obtained through an S1-MME interface between the MME and the base station.

S802. After determining that the first RB set and the second RB set have a common RB, the centralized controller adjusts the first RB set to reduce interference from a first cell to a second cell.

The method for adjusting the first RB set by the centralized controller is the same as the method for adjusting the first RB set by the first base station in the foregoing embodiment. For details, refer to the foregoing related description. Details are not described herein again.

S803. The centralized controller sends an adjusted first RB set to a first base station, so that the first base station schedules first UE based on the adjusted first RB set.

Because the foregoing solution is similar to the scheduling method described in FIG. 6, a beneficial effect that can be obtained by the foregoing solution is the same as the beneficial effect that can be obtained by using the scheduling method described in FIG. 6. Details are not described again in this embodiment of the present invention.

A person skilled in the art may understand that the scheduling method provided in the foregoing embodiment of the present invention is applicable to both uplink scheduling and downlink scheduling. This is not specifically limited in the embodiments of the present invention.

In the prior art, to ensure that transmit power of UE not only can meet a quality of service (QoS) requirement but also can save power of a terminal battery, the base station may adjust the transmit power of the UE based on a feature of an uplink, for example, a path loss feature, a shadow feature, and a fast fading feature. This process is referred to as power control. Currently, in an existing power control solution, without considering a situation of a neighboring cell, each cell adjusts transmit power of UE in the cell based only on a situation of the cell. As a result, the transmit power of the UE in the cell may be adjusted to a relatively high value. This causes severe interference to UE in the neighboring cell. In view of this, the embodiments of the present invention further provide a power control method, so as to reduce inter-cell interference to some extent, improve performance of a system edge user and average performance of a system. The following describes the power control method provided in the embodiments of the present invention with reference to the accompanying drawings in the embodiments of the present invention.

Figure 9:
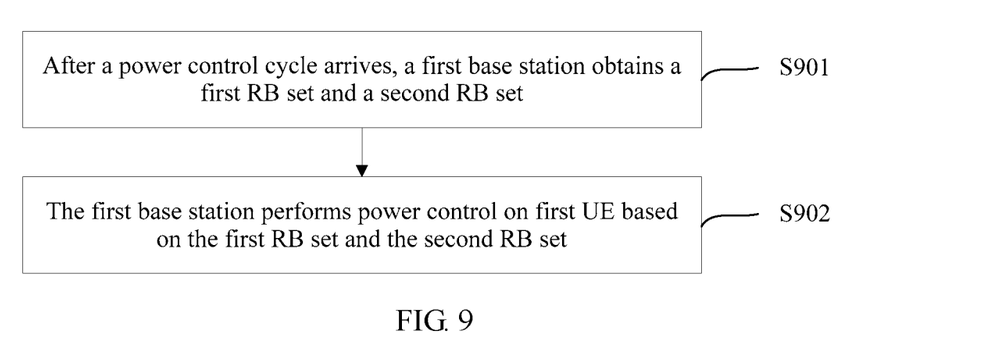
FIG. 9 is a first schematic flowchart of a power control method according to an embodiment of the present invention.

Based on the application scenarios shown in FIG. 2 to FIG. 4, an embodiment of the present invention provides a power control method. As shown in FIG. 9, the method includes the following steps.

S901. A first base station obtains a first RB set and a second RB set after a power control cycle arrives.

The first RB set is an RB set that is allocated by the first base station to first UE in a first cell at each TTI in the power control cycle, and the second RB set is an RB set that is allocated by a second base station to second UE in a second cell at each TTI in the power control cycle.

S902. The first base station performs power control on first UE based on the first RB set and the second RB set.

In an optional implementation of this embodiment of the present invention, step S902 may specifically include step S902a1 to step S902a4.

S902a1. The first base station determines, based on the first RB set and the second RB set, first system utility corresponding to each TTI in the power control cycle.

The first system utility comprises four pieces of system utility obtained if a transmit power control (TPC) command of the first UE at each TTI in the power control cycle is −1, 0, 1, and 3.

In other words, for each TTI in a current power control cycle, corresponding system utility is calculated if the TPC command of the first UE is −1, 0, 1, and 3.

Specifically, the system utility may be calculated by using formula (3) and formula (4):

$$U = \sum_j lg(x_j) \quad \text{formula (3)}$$

$$x_j = B \times \log_2\left(1 + \frac{S}{I+N}\right) \quad \text{formula (4)}$$

In the formulas, U represents the system utility, $x_j$ represents an average rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

In formula (4), transmit power S of UE may be specifically calculated according to a related formula in the 3rd Generation Partnership Project (3GPP) technical standard 36.213. A PUSCH channel is used as an example, and the transmit power of the UE may be specifically calculated by using formula (5):

$$S_{PUSCH}(i) \min\{P_{CMAX}, 10 \log_{10}(M_{PUSCH}(i)) + P_{O\_PUSCH} + a \times PL + D_{TF}(i) + f(i)\} \quad \text{formula (5)}$$

In the formula, $S_{PUSCH}(i)$ represents transmit power of the UE in a subframe i, $P_{CMAX}$ represents maximum transmit power of the UE, $M_{PUSCH}(i)$ represents a quantity of RBs allocated by the UE on the PUSCH in the subframe i or represents RB bandwidth on the PUSCH, $P_{O\_PUSCH}$ represents expected power of the PUSCH, a represents a compensation weighted value of path loss, PL represents downlink path loss calculated by the UE, f(i) represents a dynamic power control cumulative amount, and $f(i)=f(i-1)+\delta_{PUSCH}$ where $\delta_{PUSCH}(i)$ represents a value of a power control command, and $\delta_{PUSCH}(i)$ is −1, 0, 1, or 3.

S902a2. The first base station determines an optimal TPC command of the first UE at each TTI in the power control cycle based on the first system utility corresponding to each TTI in the power control cycle.

The optimal TPC command of the first UE at each TTI in the power control cycle is a TPC command corresponding to maximum system utility in the first system utility corresponding to the TTI.

For example, it is assumed that at a TTI in the current power control cycle, when the TPC command of the first UE is −1, corresponding first system utility is $U_{-1}=23$, when the TPC command of the first UE is 0, corresponding first system utility is $U_0=6$, when the TPC command of the first UE is 1, corresponding first system utility is $U_1=12$, and when the TPC command of the first UE is 3, corresponding first system utility is $U_1=5$. The maximum system utility is $U_{-1}=23$, and therefore, it is determined that the optimal TPC command of the first UE at the TTI is −1.

S902a3. The first base station determines an optimal TPC command of the first UE in the power control cycle based on the optimal TPC command of the first UE at each TTI in the power control cycle.

Specifically, there are the following two optional methods for determining the optimal TPC command of the first UE in the power control cycle.

In a first method, statistics about the optimal TPC commands of the first UE at the TTIs in the power control cycle are collected to determine a most frequent TPC command, and the most frequent TPC command is determined as the optimal TPC command of the first UE in the power control cycle.

Figure 10:
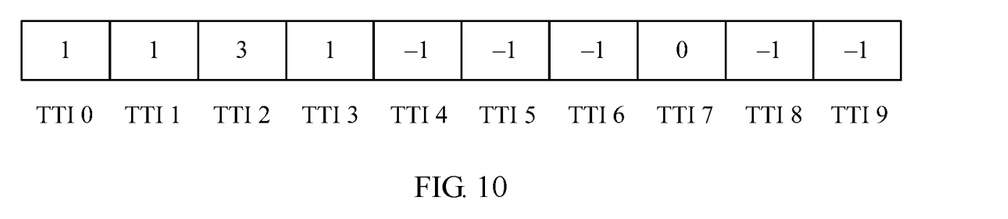
FIG. 10 is a schematic diagram of a value of an optimal TPC command of first UE at each TTI in a current power control cycle.

For example, it is assumed that one power control cycle includes 10 TTIs, and the optimal TPC command of the first UE at each TTI in the current power control cycle is shown in FIG. 10, to be specific, the optimal TPC commands of the first UE at 10 TTIs including a TTI 0, a TTI 1, a TTI 2, and so on are 1, 1, 3, 1, −1, −1, 1, 0, −1, −1 respectively. In this case, it may be determined through statistics that the TPC command value −1 occurs most frequently. Therefore, it is determined that the optimal TPC command of the first UE in the current power control cycle is −1.

In a second method, the optimal TPC commands of the first UE at the TTIs in the power control cycle are added to obtain a sum value, and an optimal TPC command of the first UE that is in the optimal TPC commands at the TTIs in the power control cycle and that is closest to the sum value is determined as the optimal TPC command of the first UE in the power control cycle.

FIG. 9 is still used as an example for description. Based on the values of the optimal TPC commands of the UE at the 10 TTIs shown in FIG. 9, a sum value of the optimal TPC commands of the UE at the TTIs is 1. If an optional value of the TPC command is −1, 0, 1, or 3, 1 is closest to the sum value 1, and therefore, the optimal TPC command of the UE in the current power control cycle is 1.

S902a4. The first base station sends the optimal TPC command to the first UE, so that the first UE adjusts transmit power based on the optimal TPC command.

It should be noted that the power control method provided in this embodiment of the present invention belongs to uplink power control, and specific content of power control may include: controlling transmit power of UE on a physical uplink shared channel (PUSCH) and transmit power of the UE sending an SRS. This is not specifically limited in this embodiment of the present invention.

Based on the foregoing solution, after the power control cycle arrives, the first base station obtains the first RB set that is allocated by the first base station to the first UE in the first cell at each TTI in the power control cycle and the second RB set that is allocated by the second base station to the second UE in the second cell at each TTI in the power control cycle, and further performs power control on the first UE based on the first RB set and the second RB set, to be specific, adjusts the transmit power of the UE, so as to reduce interference of the UE to a neighboring cell. Therefore, according to the power control method provided in this embodiment of the present invention, inter-cell interference can be reduced to some extent, thereby improving performance of a system edge user and average performance of a system.

Figure 11:
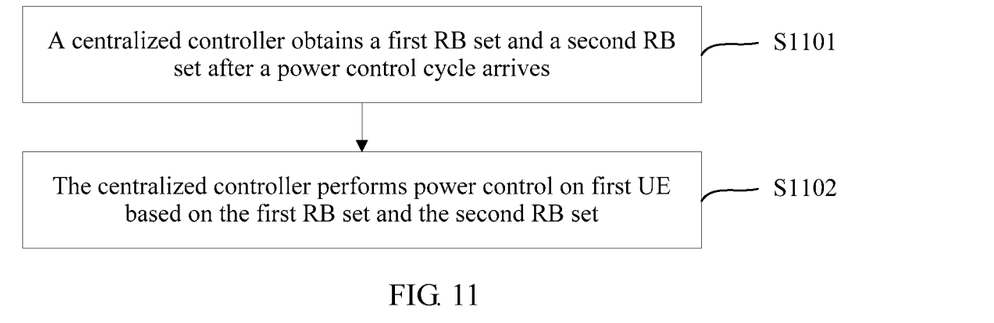
FIG. 11 is a second schematic flowchart of a power control method according to an embodiment of the present invention.

Based on the application scenario shown in FIG. 5, an embodiment of the present invention further provides a power control method. As shown in FIG. 11, the method includes the following steps.

S1101. A centralized controller obtains a first RB set and a second RB set after a power control cycle arrives.

The first RB set is an RB set that is allocated by a first base station to first UE in a first cell at each TTI in the power control cycle, and the second RB set is an RB set that is allocated by a second base station to second UE in a second cell at each TTI in the power control cycle.

In addition, for configuration of the centralized controller, refer to the related descriptions in step S801 in the foregoing embodiment.

S1102. The centralized controller performs power control on first UE based on the first RB set and the second RB set.

For a specific process of performing power control on the first UE by the centralized controller based on the first RB set and the second RB set, refer to the related descriptions in step S902 in the foregoing embodiment. A difference between the processes lies in that in this embodiment of the present invention, after determining a TPC command corresponding to the first UE, the centralized controller needs to deliver the TPC command to the first UE by using the first base station.

Because the foregoing solution is similar to the power control method described in FIG. 9, a beneficial effect that can be obtained by the foregoing solution is the same as the beneficial effect that can be obtained by using the scheduling method described in FIG. 9. Details are not described again in this embodiment of the present invention.

Figure 12:
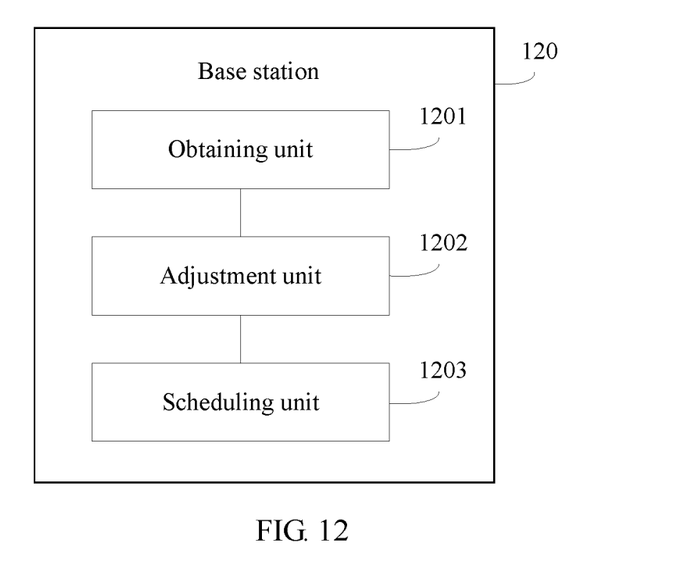
FIG. 12 is a first schematic structural diagram of a base station according to an embodiment of the present invention.

An embodiment of the present invention further provides a base station 120. As shown in FIG. 12, the base station 120 includes: an obtaining unit 1201, an adjustment unit 1202, and a scheduling unit 1203.

The obtaining unit 1201 is configured to obtain a first RB set and a second RB set.

The adjustment unit 1202 is configured to: after determining that the first RB set and the second RB set have a common RB, adjust the first RB set to reduce interference from a first cell to a second cell.

The scheduling unit 1203 is configured to schedule first UE based on an adjusted first RB set.

The first RB set is an RB set that is allocated by the base station 120 to the first UE in the first cell, and the second RB set is an RB set that is allocated by a second base station to second UE in the second cell.

In an optional implementation, in the base station 120 provided in this embodiment of the present invention, the adjustment unit 1202 may be specifically configured to:

determine whether a first RB meets a preset condition, delete the first RB from the first RB set if the first RB meets the preset condition, and use an RB following the first RB as a new first RB to perform determining until a first RB that does not meet the preset condition is found for the first time; and determine whether a second RB meets the preset condition, delete the second RB from the first RB set if the second RB meets the preset condition, and use an RB before the second RB as a new second RB to perform determining until a second RB that does not meet the preset condition is found for the first time.

The first RB is a beginning RB in the first RB set, the second RB is a last RB in the first RB set, the preset condition is that first system utility is greater than second system utility, the first system utility is system utility used when scheduling of the first UE on the first/second RB is canceled, and the second system utility is system utility used when scheduling of the first UE on the first/second RB is reserved.

Optionally, in the base station 120 provided in this embodiment of the present invention, the adjustment unit 1202 may be specifically configured to calculate system utility by using a preset calculation formula.

The preset calculation formula is:

$$U_{RB_i} = \sum_j lg(x_j),$$

and in the formula, $x_j=\log_2(1+SINR_{UEj})$, $U_{RB_i}$ represents system utility, $x_j$ represents a transmission rate of $j^{th}$ second UE in n UEs that share an $RB_i$ in a system, $SINR_{UEj}$ represents a signal to interference plus noise ratio of an uplink transmission channel from the $j^{th}$ second UE to the base station 120, and n and j are positive integers.

Optionally, in the base station 120 provided in this embodiment of the present invention, the adjustment unit 1202 may be further configured to:

if the first/second RB is deleted from the first RB set, after determining that third system utility is greater than the first system utility, allocate the first/second RB to third UE that has a scheduling requirement but has not been scheduled at a current TTI.

The third system utility is system utility used when scheduling of the third UE on the first/second RB is added.

Specifically, for the scheduling method performed by the base station provided in this embodiment of the present invention, refer to the foregoing method embodiments. Details are not described again in this embodiment of the present invention.

Based on the base station provided in this embodiment of the present invention, the base station obtains the first RB set that is allocated by the base station to the first UE in the first cell and the second RB set that is allocated by the second base station to the second UE in the second cell, and after determining that the first RB set and the second RB set have a common RB, adjusts the first RB set. The base station may specifically learn, based on the first RB set and the second RB set, which shared resources cause inter-cell interference between the first UE in the first cell and the second UE in the second cell, and accordingly adjusts the first RB set, so as to schedule the first UE in the first cell and the second UE in the second cell to different frequency bands as much as possible, thereby effectively suppressing inter-cell interference, and improving performance of a system edge user and average performance of a system.

Figure 13:
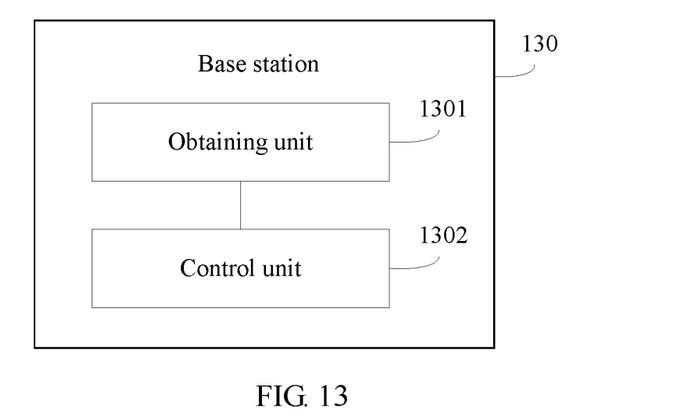
FIG. 13 is a second schematic structural diagram of a base station according to an embodiment of the present invention.

An embodiment of the present invention further provides a base station 130, as shown in FIG. 13, the base station includes: an obtaining unit 1301 and a control unit 1302.

The obtaining unit 1301 is configured to obtain a first RB set and a second RB set after a power control cycle arrives.

The control unit 1302 is configured to perform power control on first UE based on the first RB set and the second RB set.

The first RB set is an RB set that is allocated by the base station 130 to the first UE in a first cell at each TTI in the power control cycle, and the second RB set is an RB set that is allocated by a second base station to second UE in a second cell at each TTI in the power control cycle.

In an optional implementation, in the base station 130 provided in this embodiment of the present invention, the control unit 1302 may be specifically configured to:

determine, based on the first RB set and the second RB set, first system utility corresponding to each TTI in the power control cycle;

determine an optimal TPC command of the first UE at each TTI in the power control cycle based on the first system utility corresponding to each TTI in the power control cycle, where the optimal TPC command of the first UE at each TTI in the power control cycle is a TPC command corresponding to maximum system utility in the first system utility corresponding to the TTI;

determine an optimal TPC command of the first UE in the power control cycle based on the optimal TPC command of the first UE at each TTI in the power control cycle; and send the optimal TPC command to the first UE, so that the first UE adjusts transmit power based on the optimal TPC command.

The first system utility comprises four pieces of system utility obtained if a transmit power control TPC command of the first UE at each TTI in the power control cycle is −1, 0, 1, and 3.

In an optional implementation of this embodiment of the present invention, the control unit 1302 may be specifically configured to:

collect statistics about the optimal TPC commands of the first UE at the TTIs in the power control cycle to determine a most frequent TPC command, and determine the most frequent TPC command as the optimal TPC command of the first UE in the power control cycle.

In another optional implementation of this embodiment of the present invention, the control unit 1302 may be specifically configured to:

add the optimal TPC commands of the first UE at the TTIs in the power control cycle, to obtain a sum value, and determine an optimal TPC command of the first UE that is in the optimal TPC commands at the TTIs in the power control cycle and that is closest to the sum value as the optimal TPC command of the first UE in the power control cycle.

Optionally, in the base station 130 provided in this embodiment of the present invention, the control unit 1302 may be specifically configured to calculate system utility by using a preset calculation formula.

The preset calculation formula is:

$$U = \sum_j lg(x_j),$$

and in the formula, $$x_j = B \times \log_2\left(1 + \frac{S}{I+N}\right).$$

U represents the system utility, $x_j$ represents a transmission rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

Specifically, for the power control method performed by the base station provided in this embodiment of the present invention, refer to the foregoing method embodiments. Details are not described again in this embodiment of the present invention.

Based on the base station provided in this embodiment of the present invention, after the power control cycle arrives, the base station obtains the first RB set that is allocated by the base station to the first UE in the first cell at each TTI in the power control cycle and the second RB set that is allocated by the second base station to the second UE in the second cell at each TTI in the power control cycle, and further performs power control on the first UE based on the first RB set and the second RB set, to be specific, adjusts the transmit power of the UE, so as to reduce interference of the UE to a neighboring cell. Therefore, according to the power control method provided in this embodiment of the present invention, inter-cell interference can be reduced to some extent, thereby improving performance of a system edge user and average performance of a system.

Figure 14:
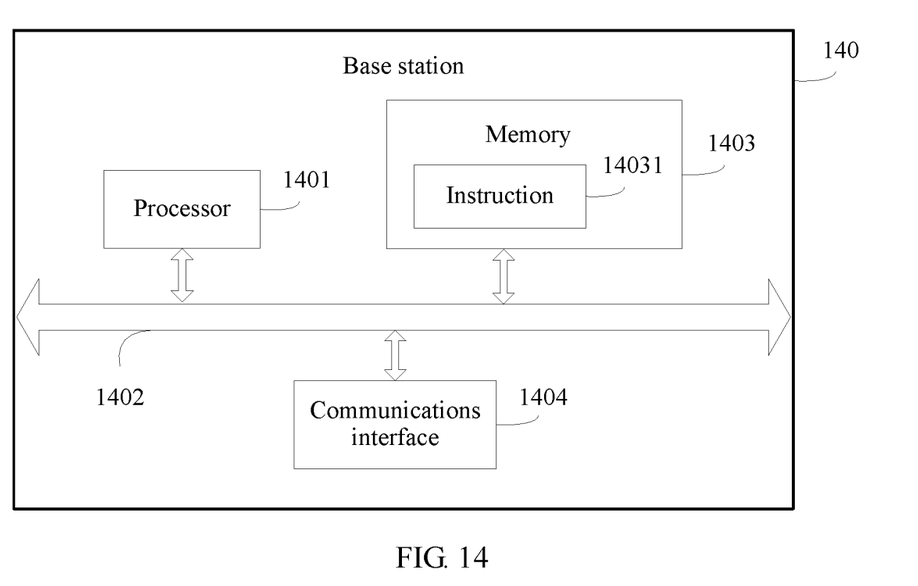
FIG. 14 is a third schematic structural diagram of a base station according to an embodiment of the present invention.

An embodiment of the present invention further provides a base station. As shown in FIG. 14, the base station includes: a processor 1401, a memory 1403, a bus 1402, and a communications interface 1404.

The processor 1401, the memory 1403, and the communications interface 1404 are connected and communicate with each other by using the bus 1402.

The processor 1401 may be a single-core or multi-core central processing unit, or an application-specific integrated circuit, or one or more integrated circuits configured to implement this embodiment of the present invention.

The memory 1403 may be a high-speed random access memory (RAM) 1403, or may be a non-volatile memory 1403, for example, at least one magnetic disk storage 1403.

The memory 1403 is configured to store a computer-executable instruction 14031. Specifically, the computer-executable instruction 14031 may include program code.

When the base station runs, the processor executes the computer-executable instruction stored in the memory, so that the base station performs the scheduling method described in FIG. 6.

The base station provided in this embodiment is configured to perform the scheduling method described in FIG. 6. Therefore, for technical effects that can be achieved by the base station, refer to the description in the foregoing method embodiment. Details are not described herein again.

Figure 15:
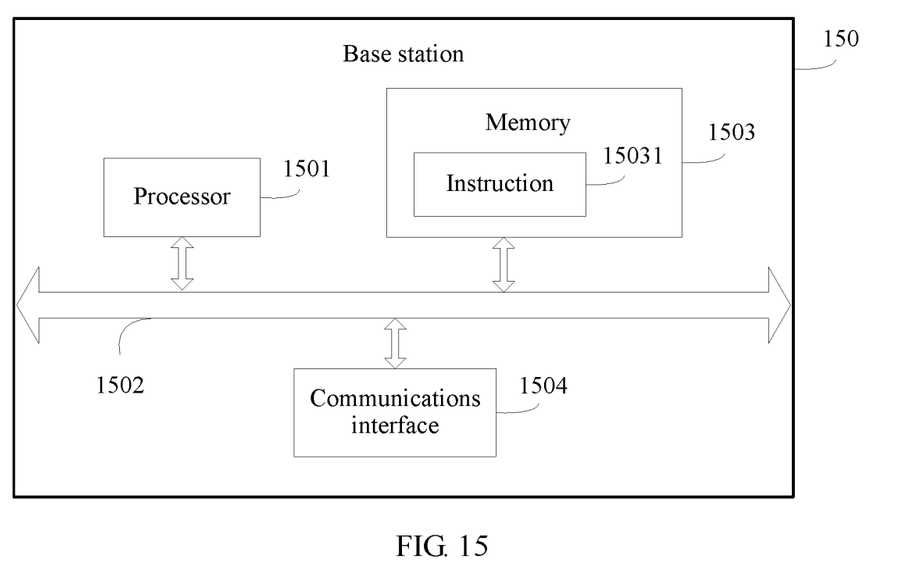
FIG. 15 is a fourth schematic structural diagram of a base station according to an embodiment of the present invention.

An embodiment of the present invention further provides a base station 150. As shown in FIG. 15, the base station includes: a processor 1501, a memory 1503, a bus 1502, and a communications interface 1504.

The processor 1501, the memory 1503, and the communications interface 1504 are connected and communicate with each other by using the bus 1502.

The processor 1501 may be a single-core or multi-core central processing unit, or an application-specific integrated circuit, or one or more integrated circuits configured to implement this embodiment of the present invention.

The memory 1503 may be a high-speed RAM, or may be a non-volatile memory 1503, such as at least one magnetic disk storage 1503.

The memory 1503 is configured to store a computer-executable instruction 15031. Specifically, the computer-executable instruction 15031 may include program code.

When the base station 150 runs, the processor 1501 executes the computer-executable instruction 15031 stored in the memory 1503, so that the base station 150 performs the power control method described in FIG. 8.

The base station provided in this embodiment is configured to perform the scheduling method described in FIG. 8. Therefore, for technical effects that can be achieved by the base station, refer to the description in the foregoing method embodiment. Details are not described herein again.

In addition, an embodiment of the present invention further provides a computer readable medium, including a computer readable instruction that performs, upon being executed, the operations performed by the base station in the method embodiments shown in FIG. 6 and FIG. 8 in the foregoing embodiments.

In addition, an embodiment of the present invention further provides a computer program product, including the foregoing computer readable medium.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A power control method, wherein the method comprises:

obtaining, by a first base station, a first resource block (RB) set and a second RB set after a power control cycle arrives, wherein the first RB set is an RB set that is allocated by the first base station to first user equipment (UE) in a first cell at each transmission time interval (TTI) in the power control cycle, and the second RB set is an RB set that is allocated by a second base station to second UE in a second cell at each TTI in the power control cycle; and performing, by the first base station, power control on the first UE based on the first RB set and the second RB set, wherein performing, by the first base station, power control on the first UE based on the first RB set and the second RB set comprises:

determining, by the first base station based on the first RB set and the second RB set, first system utility corresponding to each TTI in the power control cycle, wherein the first system utility comprises four pieces of system utility obtained if a transmit power control (TPC) command of the first UE at each TTI in the power control cycle is −1, 0, 1, and 3;

determining, by the first base station, an optimal TPC command of the first UE at each TTI in the power control cycle based on the first system utility corresponding to each TTI in the power control cycle, wherein the optimal TPC command of the first UE at each TTI in the power control cycle is a TPC command corresponding to maximum system utility in the first system utility corresponding to the TTI;

determining, by the first base station, an optimal TPC command of the first UE in the power control cycle based on the optimal TPC command of the first UE at each TTI in the power control cycle; and sending, by the first base station, the optimal TPC command to the first UE, so that the first UE adjusts transmit power based on the optimal TPC command.

2. The method according to claim 1, wherein determining, by the first base station, the optimal TPC command of the first UE in the power control cycle based on the optimal TPC command of the first UE at each TTI in the power control cycle comprises:

collecting, by the first base station, statistics about the optimal TPC commands of the first UE at the TTIs in the power control cycle to determine a most frequent TPC command, and determining the most frequent TPC command as the optimal TPC command of the first UE in the power control cycle.

3. The method according to claim 1, wherein determining, by the first base station, the optimal TPC command of the first UE in the power control cycle based on the optimal TPC command of the first UE at each TTI in the power control cycle comprises:

adding, by the first base station, the optimal TPC commands of the first UE at the TTIs in the power control cycle, to obtain a sum value, and determining an optimal TPC command of the first UE that is in the optimal TPC commands at the TTIs in the power control cycle and that is closest to the sum value as the optimal TPC command of the first UE in the power control cycle.

4. The method according to claim 1, wherein the first base station calculates system utility by using a preset calculation formula, and the preset calculation formula is:

$$U = \sum_j lg(x_j),$$

wherein $$x_j = B \times \log_2\left(1 + \frac{S}{I+N}\right),$$

U represents the system utility, $X_j$ represents a transmission rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

5. A base station, wherein the base station comprises:
a processor; and
a memory coupled to the processor for storing computer-executable instructions, wherein the computer-executable instructions, when executed by the processor, cause the base station to:
obtain a first resource block (RB) set and a second RB set after a power control cycle arrives, wherein the first RB set is an RB set that is allocated by the first base station to first user equipment (UE) in a first cell at each transmission time interval (TTI) in the power control cycle, and the second RB set is an RB set that is allocated by a second base station to second UE in a second cell at each TTI in the power control cycle;
perform power control on the first UE based on the first RB set and the second RB set;
determine first system utility corresponding to each TTI in the power control cycle based on the first RB set and the second RB set, wherein the first system utility comprises four pieces of system utility obtained if a transmit power control (TPC) command of the first UE at each TTI in the power control cycle is −1, 0, 1, and 3;
determine an optimal TPC command of the first UE at each TTI in the power control cycle based on the first system utility corresponding to each TTI in the power control cycle, wherein the optimal TPC command of the first UE at each TTI in the power control cycle is a TPC command corresponding to maximum system utility in the first system utility corresponding to the TTI;
determine an optimal TPC command of the first UE in the power control cycle based on the optimal TPC command of the first UE at each TTI in the power control cycle; and
send the optimal TPC command to the first UE, so that the first UE adjusts transmit power based on the optimal TPC command.

6. The base station according to claim 5, wherein the computer-executable instructions, when executed by the processor, further cause the base station to:
collect statistics about the optimal TPC commands of the first UE at the TTIs in the power control cycle to determine a most frequent TPC command, and determining the most frequent TPC command as the optimal TPC command of the first UE in the power control cycle.

7. The base station according to claim 5, wherein the computer-executable instructions, when executed by the processor, further cause the base station to:
add the optimal TPC commands of the first UE at the TTIs in the power control cycle, to obtain a sum value, and determining an optimal TPC command of the first UE that is in the optimal TPC commands at the TTIs in the power control cycle and that is closest to the sum value as the optimal TPC command of the first UE in the power control cycle.

8. The base station according to claim 5, wherein the computer-executable instructions, when executed by the processor, further cause the base station to:
calculate system utility by using a preset calculation formula, and the preset calculation formula is:

$$U = \sum_j lg(x_j),$$

wherein $$x_j = B \times \log_2\left(1 + \frac{S}{I+N}\right),$$

U represents the system utility, $X_j$ represents a transmission rate of $j^{th}$ UE in a system, B represents a quantity of RBs occupied by the $j^{th}$ UE, S represents transmit power of the $j^{th}$ UE, I represents intensity of interference to the $j^{th}$ UE, and N represents noise strength.

* * * * *